Jan. 29, 1946.  E. DAIBER  2,393,593
PITOT TUBE
Filed May 24, 1943
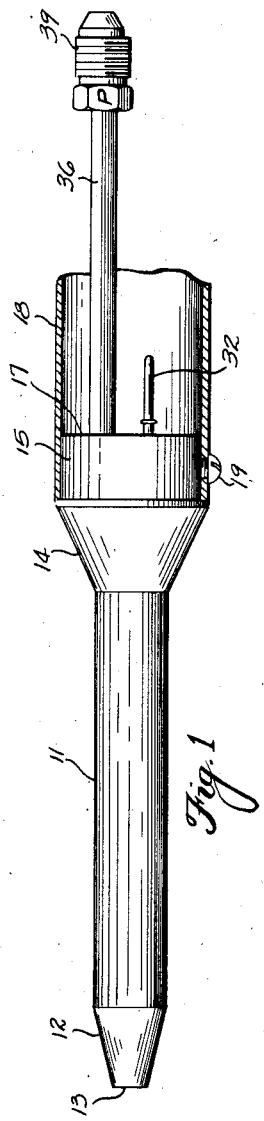
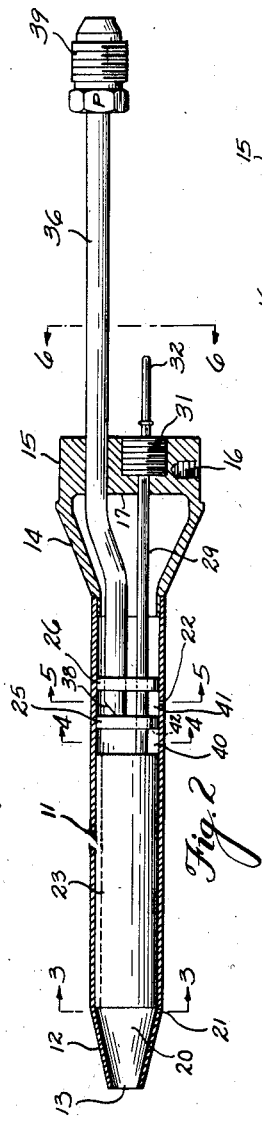
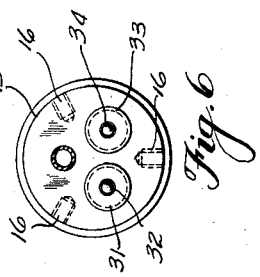
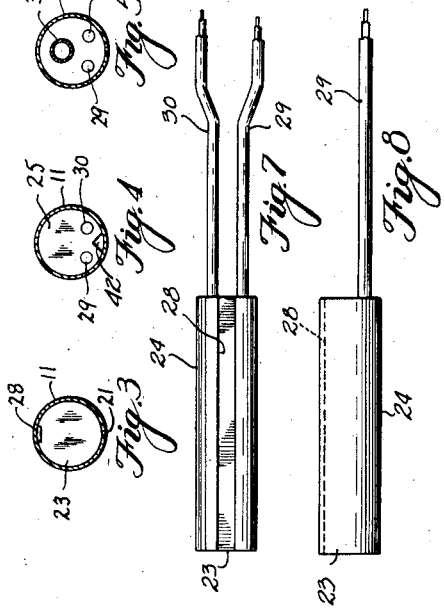
INVENTOR.
Emil Daiber
BY
Staebling and Krost
attys.

Patented Jan. 29, 1946

2,393,593

UNITED STATES PATENT OFFICE 2,393,593

PITOT TUBE

Emil Daiber, Cleveland, Ohio

Application May 24, 1943, Serial No. 488,186

2 Claims. (Cl. 73—212)

My invention relates to Pitot tubes and more particularly to Pitot tubes utilized in apparatus mounted on aircraft for indicating the speed of the aircraft, and constitutes an improvement over my pending application, Serial No. 444,872, filed May 28, 1942, for Pitot tube, now Patent 2,343,282.

My invention is particularly adapted for use in Pitot tubes mounted upon aircraft to respond to the dynamic or impact pressure created incidental to movement of the aircraft through the air, and therefore the present discussion is based upon that adaptation, although it is to be understood that my invention is not necessarily limited to that adaptation.

Pitot tubes are embodied in apparatus for indicating the speed of aircraft by mounting the tube upon the aircraft wing, outboard strut or other location on the craft where it will encounter undisturbed air-flow. The Pitot tube is connected in communication with suitable tubing or pipe with an airspeed indicator mounted on the instrument panel in the cockpit of the aircraft. The air under dynamic or impact pressure is admitted to the diaphragm pressure capsule in the airspeed indicator. Air under static pressure is admitted to the case of the instrument enclosing the capsule and thus opposes the dynamic pressure within the capsule. The indicator instrument is a sensitive differential pressure gauge and indicates the velocity pressure, that is, the difference between the dynamic or impact pressure and the static pressure, upon a dial calibrated in miles per hour or in any other units.

The Pitot tube being mounted in the open air is subjected to all climatic conditions and is particularly subjected to the moisture content of the surrounding air and to the temperature of the air. The introduction of moisture, either as rain, fog, snow or vapor into the Pitot tube has an unfavorable effect upon the operation and success of the entire apparatus.

Moisture carried into the indicating instrument may corrode the thin diaphragm capsule and impair its efficiency and operability and, as a result, decrease or ruin the effectiveness of the instrument. In the event that moisture enters the internal passages of the Pitot tube, as the aircraft passes through air laden with rain, snow, fog or other form of water, then this moisture may easily clog or obstruct the passages of the tube and the system in communication therewith. Moreover, the temperature of the surrounding air through which the aircraft travels is often so low that the Pitot tube and its contents are below the freezing point of water. The formation of ice within the internal passages of the tube and the system in communication therewith clogs and obstructs the same with the result that the tube and system become inoperative. A Pitot tube which contains frozen moisture becomes worthless and fails to produce the results for which the tube is intended.

An object of my invention is the provision of a Pitot tube having an improved construction providing for the entrapment and discharge of moisture and for maintaining the temperature of the tube sufficiently high to prevent freezing of moisture in the tube.

Another object of my invention is the provision for entrapment of moisture in a Pitot tube and for baffling the flow of moisture through the tube and for discharging or eliminating moisture from the tube.

Another object of my invention is the provision of discharging or eliminating moisture through an opening positioned along a straight portion of the tube.

Another object is the provision of an improved Pitot tube construction.

And another object is the provision for meeting the requirements as to dimensions, weight and performance of a Pitot tube, said requirements constituting a new standard not readily, economically and efficiently met or satisfied by any arrangements and constructions heretofore known and used in Pitot tubes.

Other objects and a fuller understanding of my invention may be had by referring to the following description and claims, taken in conjunction with the accompanying drawing, in which:

Figure 1 is a side elevational view of my improved Pitot tube;

Figure 2 is a cross-sectional view taken lengthwise of the tube shown in Figure 1;

Figure 3 is a transverse cross-sectional view taken through the tube in the direction of the arrows 3—3 of Figure 2;

Figure 4 is a transverse cross-sectional view taken through the tube in the direction of the arrows 4—4 of Figure 2;

Figure 5 is a transverse cross-sectional view taken through the tube in the direction of the arrows 5—5 of Figure 2;

Figure 6 is an end-wise view of the tube shown in Figure 2 looking in the direction of the arrows 6—6 of Figure 2;

Figure 7 is a plan view of the electrical heating element utilized in the tube shown in Figure 2; and Figure 8 is a side elevational view of the electrical heating element shown in Figure 7 and utilized in my tube.

My improved Pitot tube has an outer casing or tubular member 11 of hollow cylindrical shape as shown by the several views of the drawing. The forward end, that is, the left-hand end of Figures 1 and 2, is somewhat tapered to form the tapered portion 12. As the casing is preferably made of brass or copper tubing or similar heat conducting and non-magnetic material, the tapered portion 12 may be formed by spinning. At the rearward end of the tube, that is, the right-hand end of the tube shown in Figures 1 and 2, an annular casting or rear-end member 14, of copper, brass, or other suitable material, is interfitted with, and secured to, the end of the casing 11 by silver soldering or by other suitable means. The member 14 has a supporting portion 15 extended therefrom for providing a suitable support or engaging element for the tube. Threaded holes 16 in the supporting portion are provided for receiving screw bolts 19 extending through registering openings in a suitable bracket or mounting sleeve 18. The bracket or mounting sleeve 18, of which only a small sectional portion is shown in Figure 1, may be mounted upon a strut, wing or other part of the aircraft in a position to place the Pitot tube in an undisturbed airflow. The bracket or mounting sleeve 18 thus firmly supports the Pitot tube in position. The casting or end member 14 has an end wall 17 which extends transversely of the tube across the annular opening of the member 14 at its maximum diameter and thus the wall 17 provides a closure for the rear-end of the Pitot tube.

At the nose or front end of the casing a round opening 13 is provided for affording communication between the outside of the casing and the interior of the casing. As the Pitot tube is axially aligned in the direction of the flight of the aircraft and as the forward end of the tube meets the air in advance of the tube under impact, the air entering the casing through the forward opening 13 is under dynamic or impact pressure during flight of the aircraft. Therefore, in discussing the air which is introduced into the Pitot tube through the forward opening 13, the air is referred to as air under dynamic or impact pressure, or as sometimes referred to in the art, under Pitot pressure.

It is seen from the views of the drawing that the casing may be divided into three portions, the forward portion, the intermediate portion or zone, and the rearward portion. The intermediate portion has straight sides and a uniform bore. The forward portion has a variable bore increasing from the size of the opening 13 to coincide with the bore of the intermediate portion. The rearward portion has a variable bore increasing from its coincidence with the bore of the intermediate portion to its maximum at the wall 17.

The necessity and immediate instigation of the present invention arose from the requirement and urgent demand for the construction of a complete operative Pitot tube with provisions for the efficient heating of the tube for the proper entrapment and elimination of moisture in a casing of prescribed and limited dimensions. The outer view of the casing shown in Figure 1 illustrates the limitations and difficulties faced before the making of the present invention. It was required that a Pitot tube having the over-all dimensions of the casing shown in Figure 1 embody proper heating means for preventing freezing of moisture in the casing and proper means for entrapping and discharging the moisture which might enter the casing. The casing of Figures 1 and 2, in the straight portion 11, has an inside diameter of only one-half inch. (The views of Figures 1 and 2 in the drawing accompanying this application are drawn full scale and illustrate the limited dimensions of such a casing.) The minimum diameter of heating elements commercially and practically available and properly made to provide efficient heating action is also about one-half inch. The required space for metal tubing or conduits in the casing, for baffles, for chambers, and for the usual construction and arrangement of the same, and proper minimum room in which to work in assembling and mounting the parts, would not appear to be available in such a casing. The foregoing dimensions are given for demonstrating the nature of the problem presented and the lack of a satisfactory teaching in the prior art for solving the problem. The dimensions are not, however, to be considered in themselves as constituting limitations on the scope of the invention disclosed and claimed herein.

A cylindrically shaped electric heating element 23 is positioned, and secured in place, within the casing 11 just rearwardly of the tapered portion 12. The heating element 23 may comprise an electrical heating coil enclosed in an outer sheath 24 of "Monometal," copper, brass or other heat conducting and non-magnetic material. The sheath 24 is of cylindrical shape covering the outer cylindrical surface of the heating element and the end walls thereof.

The heating element 23 has substantially the same outside diameter as the inside diameter of the casing 11 and substantially fills the bore of the casing at its straight or intermediate portion. It is seen from the views of the drawing that the heating element divides the interior of the casing into a forward chamber 20 in advance of the heating element and the rearward wall of the heating element in combination with a baffle 25 divides the casing into a first intermediate chamber 40, and the baffle 25 in combination with a baffle 26 divides the casing into a second intermediate chamber 41. It is also apparent from the drawing that there is no space for metal tubing or a conduit alongside the heating element and within the casing. To provide passageway within the casing from the forward chamber to the rearward chamber a depression, groove, or channel 28 is formed in the metal sheath 24, the channel extending the length of the heating element adjacent the top thereof. By thus relieving the heating element and casing from each other along a portion of their common cylindrical meeting surfaces a passageway is provided for placing the forward chamber 20 and the first intermediate chamber 40 in communication. It is preferable that the channel 28 be disposed at or near the top of the heating element so as to provide that the communication is between the upper portions of the said chambers.

The forward end wall face of the heating element provides a first baffle for meeting air and moisture entering the casing through the front opening 13. A discharge port or hole 21 drilled through, or otherwise formed in, the bottom of the casing 11 in advance of the heating element provides for the discharge of moisture entrapped in the forward chamber 20 in advance of the first baffle (front end of the heating element). As the discharge port 21 is located at the lowermost part of the forward chamber 20, the moisture will be discharged as it is entrapped, being forced outwardy by the air pressure. The air upon passing through the channel or groove 28 enters the top of the first intermediate chamber 40 and flows to the bottom of the chamber where it passes through a cut away portion 42 along the lower edge of the baffle 25 to the bottom of the second intermediate chamber 41. The air then flows upwardly in the second intermediate chamber 41 and then enters the forward inclined opened end 38 of conduit or pipe 36.

The baffle 26 provides a partition for meeting air and moisture (if any moisture gets back that far) moving back through the casing. A discharge port or hole 22 drilled through, or otherwise formed in, the bottom of the casing between the baffles 25 and 26 provides for the discharge of moisture entrapped in the second intermediate chamber 41 in advance of the baffle 26. As the discharge port 22 is located at the lowermost part of the second intermediate chamber 41 the moisture will be discharged as it is entrapped, being forced outwardly by the air pressure.

In some aircraft a two-wire electrical system is used and in others a single-wire system is used. In the illustration of my invention two wires are shown only by way of example. Suitably insulated wires 29 and 30 extend back from the element 23 through the baffles 25 and 26, and out through the wall 17 (by a hermetic seal therewith) and there connect with plug and pin assembly 31 and 32 and plug and pin assembly 33 and 34, respectively. The electrical circuit arrangement is such that connection of the pins 32 and 34 with a source of electrical energy, such as the battery of the aircraft, energizes the heating element and causes it to generate heat. In a single wire system only the wire 29 and plug and pin assembly 31 and 32 is utilized, the other connection being obtained by grounding to the metal framework of aircraft in the usual manner.

The conduit member or pipe 36 extends through baffle 26 and the wall 17 (by a hermetic seal therewith) near the upper portion thereof. The conduit 36 is adapted to communicate with an airspeed indicator in the cockpit of the aircraft by suitable tubing not shown, the threaded nipple 39 being adapted to connect with such tubing. The indicia P on the threaded nipple indicates to the assembler of the apparatus that the nipple is to be connected to the tubing on the Pitot (dynamo or impact pressure) side of the airspeed indicator.

The inner or forward inclined end 38 of the conduit 36 terminates in the upper portion of the second intermediate chamber 41 as shown in Figure 2. As an added safeguard against moisture entering into the conduit 36 the extreme left-hand end thereof is abutted against the baffle 25. The opening 38 is cut or formed at an inclined angle on the upper side of the conduit 36. Air must move through a circuitous path to enter the conduit 36.

The heating element 23 being in good thermal connection with the casing 11 around a large or predominating percentage of its cylindrical surface causes the casing to be rapidly and efficiently heated, the heat being properly and thoroughly distributed, and the air in the casing being maintained at above freezing temperature. The air in the channel or passageway 28 is in intimate thermal relationship with the heating element and is efficiently heated, the heat therefrom passing back into casing and being distributed to the air in the casing. It has been found that the arrangement here disclosed not only answers the difficult problems presented by the small diameter casing and the necessity of placing the parts therein, but also provides a Pitot tube of superior operation under varying and severe climatic conditions. The baffles 25 and 26 are placed adjacent the rear end of the heating element 23 so that the moisture in the first and second intermediate chambers 40 and 41 and in the entrance end of the conduit 36 is maintained above the freezing point.

The arrangement also provides for ease and economy in manufacture. For example, with the present arrangement it is not necessary to hermetically seal the peripheral edge of the heating element to the inner wall of the casing as was required in other arrangements. As the front chamber is in communication with the first intermediate chamber 40, it does not matter if there is leakage of air around the side of the heating element. This elimination of the need for making a hermetic seal in such a confined working space is a great advantage. Only enough solder need be introduced into the casing through the front opening 13 as is required to secure the heating element 23 in place to the wall of the casing.

The present construction also obviates the necessity of using metal tubes or conduits within the casing to conduct air through the casing from one end to another, the casing itself acting as the conduit. This provides for a decrease in the weight of the complete Pitot tube, for eliminating the use of a large amount of scarce and critical material (as the metal tubes or conduits are usually of copper or brass), and for facilitating and increasing the manufacturing process and rate.

The assembly of the Pitot tube is simple and facile. With the casting 14 initially separated from the tubular portion of the casing, the heating element with wires extended therefrom, the baffles 25 and 26, and the conduit 36 are inserted into the rear open end of the casing and positioned as shown in Figure 2. The baffles 25 and 26 have holes through which the tubular casings surrounding the wires pass. Silver solder may be employed to anchor the baffles 25 and 26 to the tubular casing surrounding the wire to effect a hermetic seal therewith. The left-hand end of the conduit 36 passes through a hole in the baffle 26 and is hermetically sealed therewith by silver solder. Before the rear end member 14 is mounted on the longitudinal casing 11, the baffle 26 is silver soldered to the inside of the casing 11. The casting or rear end member 14 is then mounted in position with the conduit 36 and the wires 29 and 30 extending through the provided holes therein, the member 14 and tubular casing being secured together by silver solder or other suitable means. The respective plug and pin assemblies 31, 32 and 33, 34 are then connected to the wires 29 and 30, and a hermetic seal made between the conduit 36, and the wires with member 14. The heating element 23 may be held in position by silver solder introduced into the casing through the opening 13. The assembled tube is then ready to be mounted in position and connected to the Pitot air line tubing of the aircraft and then to the provided electrical terminals.

The references to "upper" and "lower," portions or directions are directed to the upper and lower horizontal parts of the Pitot tube as disposed in Figures 1 and 2. The tube is mounted to aircraft in the horizontal position shown in Figures 1 and 2 and the references to "upper," "below," "above," "lower," "top," and "bottom," are based upon the disposition of the tube in this horizontal plane.

In the description and claims reference is sometimes made to the passing, the entering, the moving, or the flowing of air through the casing, passageways, conduit, chambers and tubing. This language is used in a broad, and perhaps not always accurate, sense for the purpose of making the interrelationship of the parts more apparent and clear. It is understood, however, that under stable conditions when the casing, passageways, conduit, chambers, and tubing are full of air and the operating conditions remain the same (no change in speed), there is little or no movement or actual flow of air through the said casing, passageways, conduit, chambers, and tubing as the tubing or pipe connected to the threaded nipple 39 terminates in a closed chamber in the airspeed indicator. There is a transmission of pressure of the contained air which for purposes of illustration and simplicity is loosely referred to as flow of air.

The present disclosure includes the description in the appended claims as well as in the foregoing specification, the description contained in the claims being incorporated herein by reference.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a Pitot tube, a longitudinal hollow cylindrical casing, said casing having an open forward end for receiving air under dynamic pressure, an electrical heating element mounted in said casing rearwardly of the said open forward end, said heating element substantially filling the internal cross-sectional area of the said casing to form a first chamber in the casing intermediate to the heating element and said forward open end, discharge means for discharging entrapped moisture in said first chamber outwardly through the bottom of said casing in advance of the heating element, a first baffle spaced rearwardly from the rear end of the heating element for defining a first intermediate chamber, a second baffle spaced rearwardly of the first baffle to define a second intermediate chamber, said first baffle providing communication between the first intermediate chamber and the second intermediate chamber along the bottom of the casing, said heating element being enclosed in a metallic sheath having a channel formed therein and extending longitudinal of the element to provide passageway for air under dynamic pressure between the casing and the heating element and connecting said first chamber with the first intermediate chamber, a closure member closing the rear end portion of the casing, a conduit member adapted to communicate with an air speed indicator and extending through said closure and said second baffle into the second intermediate chamber and opening into the upper portion of the said second intermediate chamber, and second discharge means in the casing for discharging entrapped moisture in the second intermediate chamber outwardly through the bottom of the casing in advance of the second baffle, said baffles being positioned adjacent the rear end of the heating element for maintaining moisture in the first and second intermediate chambers and in the entrance end of the conduit member above the freezing point, said baffles and said second discharge means being confined within the straight sides of the cylindrical casing unaffected by air flow along the outside of the forward and rearward portions of the cylindrical casing.

2. In a Pitot tube, a longitudinal hollow cylindrical casing, said casing having an open forward end for receiving air under dynamic pressure, a heating element having a forward and a rearward end positioned in the casing, said forward end of the heating element providing a first chamber in communication with said open forward end, discharge means for discharging entrapped moisture in the said first chamber outwardly through the bottom of the said first chamber, a first baffle positioned in the casing rearwardly of the rear end of the heating element for producing a second chamber, a second baffle positioned in the casing rearwardly of the first baffle and producing a third chamber in the casing, means for providing air communication between the upper portions of the first and the second chambers, means for providing air communication between the lower portions of the second and third chambers, a conduit member in communication with the upper portion of the third chamber and extending from the casing, said third chamber having second discharge means in the casing for discharging entrapped moisture in the third chamber outwardly through the bottom of the casing, said heating element in the casing maintaining the moisture in the chambers and in the entrance end of the conduit member above freezing point, said second discharge means being confined within the straight sides of the cylindrical casing unaffected by air flow on the outside of the forward and rearward portion of the cylindrical casing.

EMIL DAIBER.